United States Patent
Räikkönen

(10) Patent No.: US 11,725,988 B2
(45) Date of Patent: Aug. 15, 2023

(54) OPTICAL ASSEMBLY FOR OPTICAL EMISSION SPECTROSCOPY

(71) Applicant: HITACHI HIGH-TECH ANALYTICAL SCIENCE FINLAND OY, Espoo (FI)

(72) Inventor: Esa Räikkönen, Espoo (FI)

(73) Assignee: HITACHI HIGH-TECH ANALYTICAL SCIENCE FINLAND OY, Espoo (FI)

( * ) Notice: Subject to any disclaimer, the term of this patent is extended or adjusted under 35 U.S.C. 154(b) by 0 days.

(21) Appl. No.: 17/747,503

(22) Filed: May 18, 2022

(65) Prior Publication Data

US 2022/0373393 A1   Nov. 24, 2022

(30) Foreign Application Priority Data

May 19, 2021  (EP) ..................... 21174734

(51) Int. Cl.
| | |
|---|---|
| *G01J 3/02* | (2006.01) |
| *G01J 3/443* | (2006.01) |
| *G06V 10/25* | (2022.01) |
| *G01J 3/06* | (2006.01) |
| *G01J 3/28* | (2006.01) |

(Continued)

(52) U.S. Cl.
CPC ............. *G01J 3/443* (2013.01); *G01J 3/0208* (2013.01); *G01J 3/0256* (2013.01); *G01J 3/06* (2013.01); *G01J 3/2803* (2013.01); *G02B 5/001* (2013.01); *G02B 17/0808* (2013.01); *G02B 19/0023* (2013.01); *G02B 26/10* (2013.01);

(Continued)

(58) Field of Classification Search
CPC ........ G01J 3/443; G01J 3/0208; G01J 3/0256; G01J 3/06; G01J 3/2803; G01J 2003/064; G01J 3/021; G02B 5/001; G02B 17/0808; G02B 19/0023; G02B 26/10; G06V 10/25; G01N 2201/105; G01N 21/718
See application file for complete search history.

(56) References Cited

U.S. PATENT DOCUMENTS 4,154,529 A * 5/1979 Dyott ................. G01N 15/0205
356/28
4,422,181 A * 12/1983 Grafton ................. H04B 10/40
398/139

(Continued)

*Primary Examiner* — Abdullahi Nur
(74) *Attorney, Agent, or Firm* — Nixon & Vanderhye

(57) ABSTRACT

An optical assembly for an analyzer instrument for analysis of elemental composition of a sample using optical emission spectroscopy includes: an exciter generating an excitation focused at a target position to produce optical emission from the sample; and an optical arrangement including a light collection arrangement transferring the optical emission from the target position to a detector assembly's detector interface. The light collection arrangement includes: an off-axis parabolic light collecting mirror including an aperture, a lens arrangement including converging and diverging axicon lens portions, the lens arrangement positioned so its optical axis is parallel to that of the light collecting mirror and intersects a surface of the light collecting mirror at the aperture, and an off-axis parabolic focusing mirror having its focal point at the detector interface, the optical axis of the lens arrangement being parallel to that of the focusing mirror and intersects the focusing mirror's surface.

20 Claims, 4 Drawing Sheets

(51) Int. Cl.
  *G02B 5/00*   (2006.01)
  *G02B 17/08*  (2006.01)
  *G02B 19/00*  (2006.01)
  *G02B 26/10*  (2006.01)

(52) U.S. Cl.
  CPC ........ *G06V 10/25* (2022.01); *G01J 2003/064* (2013.01); *G06V 2201/07* (2022.01)

(56) References Cited

U.S. PATENT DOCUMENTS

| | | | | |
|---|---|---|---|---|
| 4,559,445 | A | * | 12/1985 | Hedin .................. G01S 7/4812 250/203.1 |
| 4,887,592 | A | * | 12/1989 | Loertscher ............ G02B 5/001 606/5 |
| 4,997,250 | A | * | 3/1991 | Ortiz, Jr. ................ G02B 27/09 219/121.75 |
| 5,206,515 | A | * | 4/1993 | Elliott .................. B23K 26/066 250/492.1 |
| 5,256,853 | A | * | 10/1993 | McIntyre ............. B23K 26/066 219/121.75 |
| 5,428,438 | A | * | 6/1995 | Komine .................... G01P 5/26 356/28.5 |
| 11,435,322 | B2 | * | 9/2022 | Sangu ................ G01N 29/2418 |

\* cited by examiner

200

> Generate an excitation focused at a target position to invoke an optical emission from a sample positioned at the target position
> 202

> Transfer the optical emission from the target position to a detector interface of a detector assembly
> 204

>> Reflect the optical emission as a collimated light beam having a substantially annular cross-section via using an off-axis parabolic collecting mirror including an aperture, having its focal point at the target position, and disposed with respect to an exciter such that the propagation path of the excitation passes through the aperture
>> 204a >> Convert the collimated light beam into a converted collimated light beam of a reduced diameter having a substantially circular cross-section via using a lens arrangement comprising a converging axicon lens portion followed by a diverging axicon lens portion, which lens arrangement is disposed with respect to the light collecting mirror such that its optical axis is parallel to an optical axis of the light collecting mirror and intersects a surface of the light collecting mirror at a position of the aperture therein
>> 204b >> Focus the converted collimated light beam to a detector interface via using an off-axis parabolic focusing mirror having its focal point at the detector interface and that is disposed with respect to the lens arrangement such that the optical axis of the lens arrangement is parallel to the optical axis of focusing mirror and intersects a surface of the focusing mirror
>> 204c

```
┌─────────────────────────────────────────────────────────────┐
│ Obtain one or more images of a sample depciting an area     │
│ around a target position                                    │
│ 302                                                         │
└─────────────────────────────────────────────────────────────┘
                              │
                              ▼
┌─────────────────────────────────────────────────────────────┐
│ Carry out an image analysis based on the obtained one or    │
│ more images to identify a target of interest in the one or  │
│ more images                                                 │
│ 304                                                         │
└─────────────────────────────────────────────────────────────┘
                              │
                              ▼
┌─────────────────────────────────────────────────────────────┐
│ Move the target position with respect to the sample to a    │
│ location that overlaps the target of interest               │
│ 306                                                         │
└─────────────────────────────────────────────────────────────┘
                              │
                              ▼
┌─────────────────────────────────────────────────────────────┐
│ Carry out an analysis of elemental composition of the       │
│ sample using the method 200                                 │
│ 308                                                         │
└─────────────────────────────────────────────────────────────┘
```

Figure 6

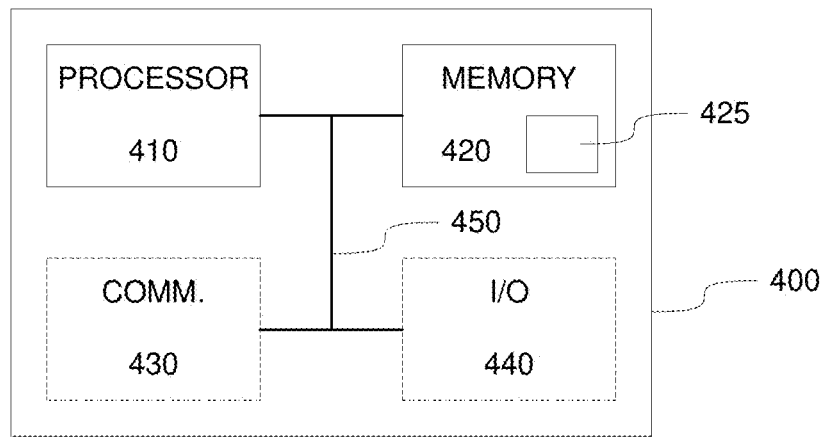

Figure 7

OPTICAL ASSEMBLY FOR OPTICAL EMISSION SPECTROSCOPY

This application claims priority to EP 21174734.0 filed May 19, 2021, the entire contents of which are hereby incorporated by reference.

TECHNICAL FIELD

The present invention relates to an apparatus for analysis of elemental composition of a sample using optical emission spectroscopy.

BACKGROUND

Optical emission spectroscopy enables analysis of elemental composition of samples both in handheld instruments applicable in field conditions and in desktop (or benchtop) instruments applicable e.g. in laboratory conditions. An instrument that makes use of optical emission spectroscopy may be referred to as an optical analyzer instrument. An optical analyzer instrument typically includes an excitation source for invoking an optical emission from a sample under study, an optical arrangement for focusing the excitation on the sample under study and for transferring the optical emission to a spectral detector, and an analyzer for determination of the elemental composition of the sample under study on the basis of the optical emission captured at the spectral detector.

A well-known example of an optical emission spectroscopy technique is laser-induced breakdown spectroscopy (LIBS), while an optical analyzer instrument making use of LIBS may be referred to as a LIBS analyzer. A LIBS analyzer comprises, as the excitation source, a laser source that is arranged to generate a high peak power laser pulses that are focused by the optical arrangement to the sample under study to form a plasma plume on its surface. During plasma formation free electrons start to recombine with ions, and this event invokes optical emission at wavelength(s) that are characteristic to elements on the surface of the sample. The light emission is transferred via the optical arrangement to the spectral detector, which captures one or more detector signals that are descriptive of the dispersed optical emission and that serve as basis for analysis of elemental composition of the sample by the analyzer, where the analysis may be based on intensity distribution of dispersed optical emission across a range of wavelengths.

In a typical design of an optical analyzer instrument such as a LIBS analyzer the optical arrangement comprises one or more optical components (e.g. one or more lenses and/or one or more mirrors) arranged to focus the excitation on the surface of the sample under study and to collect and focus the optical emission to the spectral detector. Especially when designing the light collection optics for a handheld optical analyzer instrument, providing the optical arrangement in a relatively small size without compromising the resulting analysis performance is an advantage that improves agility of the handheld optical analyzer device in field conditions.

SUMMARY

It is therefore an object of the present invention to provide an optical arrangement for an optical analyzer device that enables further reducing the size of the analyzer instrument without compromising the detection performance.

In the following a simplified summary of some embodiments of the present invention is provided in order to facilitate a basic understanding of the invention. The summary is not, however, an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an example embodiment of the invention, an optical assembly for an analyzer instrument for analysis of elemental composition of a sample using optical emission spectroscopy is provided, the optical assembly comprising: an exciter for generating an excitation focused at a target position to invoke an optical emission from the sample positioned at the target position; and an optical arrangement comprising a light collection arrangement for transferring the optical emission from the target position to a detector interface of a detector assembly, the light collection arrangement comprising: an off-axis parabolic light collecting mirror including an aperture and having its focal point at the target position, disposed with respect to the exciter such that a propagation path of the excitation passes through the aperture, a lens arrangement comprising a converging axicon lens portion followed by a diverging axicon lens portion, the lens arrangement disposed with respect to the light collecting mirror such that its optical axis is parallel to an optical axis of the light collecting mirror and intersects a surface of the light collecting mirror at a position of the aperture therein, and an off-axis parabolic focusing mirror having its focal point at the detector interface, disposed with respect to the lens arrangement such that the optical axis of the lens arrangement is parallel to an optical axis of the focusing mirror and intersects a surface of the focusing mirror.

In accordance with another example embodiment of the invention, an analyzer instrument for analysis of elemental composition of a sample using optical emission spectroscopy is provided, the analyzer instrument comprising: an optical assembly according to the example embodiment described in the foregoing arranged in a space within a portion of a housing of the analyzer instrument.

In accordance with another example embodiment of the invention, a method for facilitating analysis of elemental composition of a sample using optical emission spectroscopy is provided, the method comprising: generating an excitation focused at a target position to invoke an optical emission from the sample positioned at the target position; and transferring the optical emission from the target position to a detector interface of a detector assembly, comprising: reflecting the optical emission originating from the target position as a collimated light beam having a substantially annular cross-section via using an off-axis parabolic collecting mirror including an aperture, having its focal point at the target position and disposed with respect to the exciter such that a propagation path of the excitation passes through the aperture, converting the collimated light beam received from the light collecting mirror into a converted collimated light beam of a reduced diameter having a substantially circular cross-section via using a lens arrangement comprising a converging axicon lens portion followed by a diverging axicon lens portion and disposed with respect to the light collecting mirror such that its optical axis is parallel to an optical axis of the light collecting mirror and intersects a surface of the light collecting mirror at a position of the aperture therein, and focusing the converted collimated light beam received from the lens arrangement to the detector interface via using an off-axis parabolic focusing mirror having its focal point at the detector interface and that is disposed with respect to the lens arrangement such that the optical axis of the lens arrangement is parallel to an optical axis of focusing mirror and intersects a surface of the focusing mirror.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

The embodiments of the invention are illustrated by way of example, and not by way of limitation, in the figures of the accompanying drawings, where

FIG. 4 depicts a flowchart that illustrates a method according to an example;

FIG. 6 depicts a flowchart that illustrates a method according to an example; and FIG. 7 depicts a block diagram of some elements of an apparatus according to an example.

DETAILED DESCRIPTION

Figure 1:
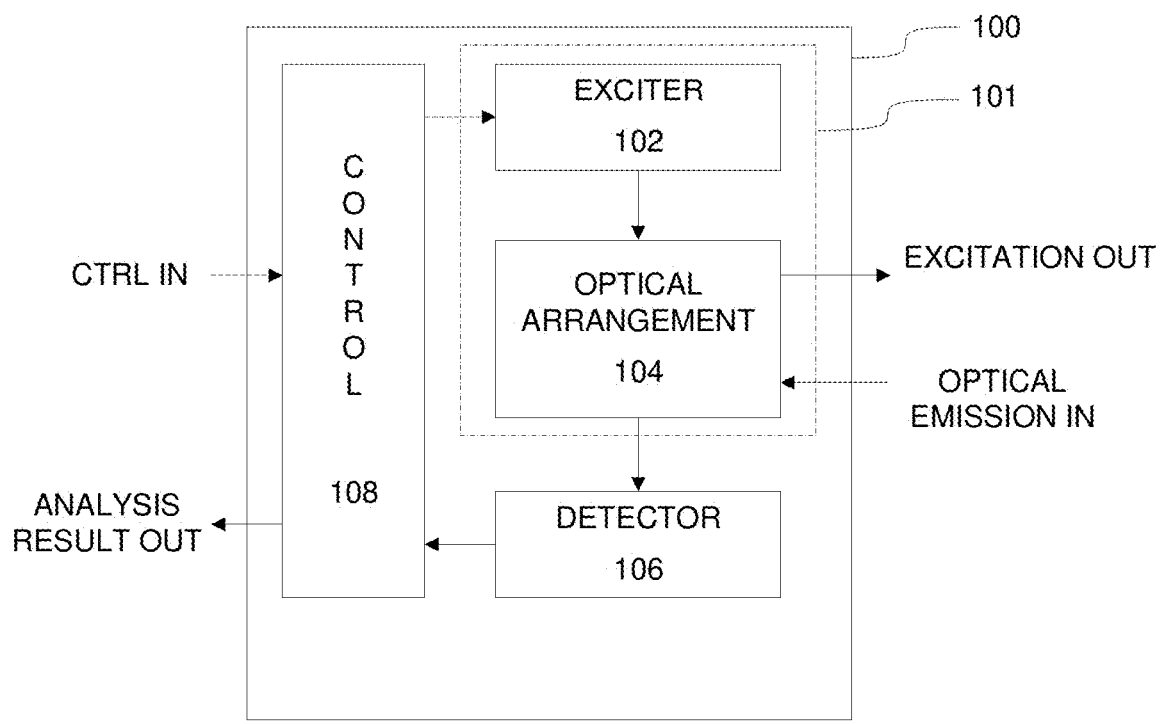
FIG. 1 illustrates a block diagram of some logical elements of an optical engine according to an example together with some elements of an analyzer instrument that is useable for analysis of elemental composition of a sample using optical emission spectroscopy via application of the optical engine.
Figure 2:
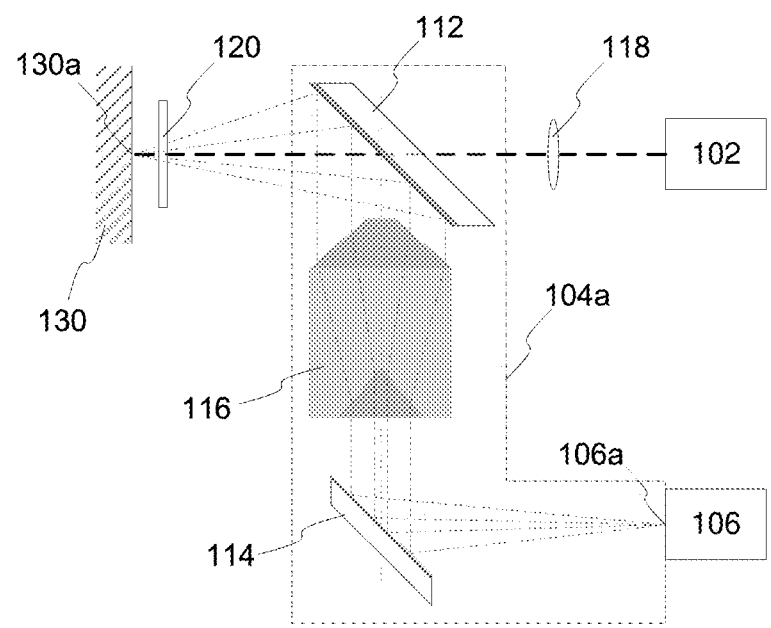
FIG. 2 schematically illustrates some aspects of an optical engine according to an example together with some elements of an analyzer instrument and with a sample.

FIG. 1 illustrates a block diagram of some logical elements of optical engine 101 according to an example together with some elements of an analyzer instrument 100 that is useable for analysis of elemental composition of a sample using optical emission spectroscopy via application of the optical engine 101, whereas FIG. 2 schematically illustrates some aspects of the optical engine 101 according to an example together with some elements of the analyzer instrument 100 and with a sample 130. The optical engine 101 may be alternatively referred to as an optical assembly, as a light collection engine, as a light collection assembly, etc. Nevertheless, in the following examples this entity is predominantly referred to as the optical engine 101.

The optical engine 101 comprises an exciter 102 for generating an excitation in order to invoke an optical emission from the sample 130 and an optical arrangement 104 for transferring the excitation emitted from the exciter 102 to a surface of the sample 130 and for transferring the optical emission invoked from the sample 130 to a detector interface 106a of a detector assembly 106. The elements of the analyzer instrument 100 shown in FIG. 1 and/or FIG. 2 include the detector assembly 106 for generating one or more measurement signals that are descriptive of optical emission received therein via the detector interface 106a and a controller 108 for controlling at least some aspects of operation of the exciter 102 and the detector assembly 106 and for carrying out analysis of elemental composition of the sample 130 based on the one or more measurement signals generated in the detector assembly 106.

Each of the exciter 102, the detector assembly 106 and the controller 108 may be provided using respective techniques known in the art hence they are not described in detail in the present disclosure. However, for completeness of the description, in the following a few non-limiting examples of providing each of the exciter 102, the detector assembly 106 and the controller 108 are described at a high level, whereas further details concerning their characteristics and operation are provided in context of examples that pertain to the optical arrangement 104 to extent such details are necessary for understanding characteristics of the optical arrangement 104.

The exciter 102 may be arranged to operate under control of the controller 108, e.g. based on an activation signal issued by the controller 108. The exciter 102 may comprise, for example, a light source that is arranged to generate excitation that comprises a single light pulse or a series of two or more light pulses that exhibit predefined pulse characteristics or that exhibit pulse characteristics defined in the activation signal. In an example, the exciter 102 may comprise a laser source and, consequently, the light pulses emitted therefrom are laser pulses. In such a scenario, the analyzer instrument 100 may be referred to as a laser-induced breakdown spectroscopy (LIBS) analyzer.

The detector assembly 106 may, at least conceptually, comprise the detector interface 106a for receiving the optical emission invoked in the sample 130, a spectrometer for dispersing the optical emission into a set of wavelengths and a detector for generating the one or more measurement signals that are descriptive of the optical emission based on the dispersed optical emission received thereat. In this regard, the detector interface 106a serves as an entry point to the detector assembly 106 and it may comprise, for example, an entrance slit of the spectrometer or an end of an optical fiber having its other end coupled to the spectrometer, whereas the detector may comprise, for example, an image sensor provided as a charge-coupled device (CCD), as a complementary metal-oxide-semiconductor (CMOS) sensor or, in general, as any (silicon-based) solid state sensor.

The controller 108 may be provided, for example, by an apparatus that comprises a processor and a memory, where the memory is arranged to store computer program code that, when executed by the processor, causes the apparatus to operate as the controller 108 according to the present disclosure. A more detailed example of providing the controller 108 via usage of such an apparatus is provided in the following with references to FIG. 7. As particular examples of its operation, the controller 108 may be arranged to carry out spectral analysis in response to a trigger signal, where the trigger signal may be received, for example, in response to the user operating a user interface (UI) of the analyzer instrument 100 accordingly. The spectral analysis may comprise the controller 108 operating the exciter 102 to generate the excitation in order to invoke the optical emission from the sample 130, the controller 108 recording the one or more measurement signals generated by the detector assembly 106 in response to the optical emission from the sample 130, and the controller 108 carrying out the analysis of elemental composition of the sample 130 based on the one or more measurement signals.

Along the lines described in the foregoing, FIG. 2 schematically illustrates some elements of the optical engine 101 in further detail together with some further elements of the analyzer instrument 100 and with the sample 130. In particular, the illustration of FIG. 2 schematically depicts a light collection arrangement 104a including a light collecting mirror 112, a focusing mirror 114 and a lens arrangement 116, characteristics of which are described in more detail later in this text. In this regard, elements of the optical engine 101 and the detector interface 106a may be arranged in a space dedicated therefor within a portion of a housing of the analyzer instrument 100. The position and role of the optical engine 101 in the analyzer instrument 100 is described in more detail in examples provided in the following.

The exciter 102 may be positioned in said space within the housing of the analyzer instrument such that it is able to emit the excitation therefrom towards a target position 130a that is outside said space and outside the analyzer instrument. In this regard, said space may include an opening through which the excitation is able to exit said space and the optical emission invoked from the sample 130 is able to enter said space. The optical arrangement 104 may further comprise a focusing lens 118 for focusing the excitation at the target position 130a, where the focusing lens 118 may be arranged in a propagation path of the excitation between the exciter 102 and the light collecting mirror 112. In another example, the exciter 102 may be provided with an integrated focusing lens or a focusing assembly of other kind for focusing the excitation at the target position 130a may be applied, thereby rendering the separate focusing lens 118 unnecessary.

The light collecting mirror 112 may comprise an off-axis parabolic mirror having its focal point substantially at the target position 130a. The light collecting mirror 112 includes an aperture and the light collecting mirror 112 is positioned with respect to the exciter 102 such that the propagation path of the excitation passes through the aperture. The off-axis parabolic light collecting mirror 112 serves to reflect the optical emission originating from the target position 130a (located at its focal point) as a collimated light beam that is parallel to the optical axis of the light collecting mirror 112. In an example, the light collecting mirror 112 may be oriented with respect to the propagation path of the excitation such that the optical axis of the light collecting mirror 112 is substantially perpendicular to the propagation path, whereas in another example the light collecting mirror 112 may be oriented with respect to the propagation path of the excitation such that the optical axis of the light collecting mirror 112 is in an oblique angle with respect to the propagation path. In an example, the aperture is located substantially in a center of the light collecting mirror 112, e.g. at a position of the optical axis of the light collecting mirror 112, resulting in a coaxial design where the center axis of the optical emission received at the light collecting mirror 112 is aligned (e.g. coaxial) with the propagation path of the excitation.

The lens arrangement 116 may comprise a combination of a converging axicon lens portion and a diverging axicon lens portion arranged on the same optical axis, where the lens arrangement 116 may be oriented with respect to the light collecting mirror 112 such that the collimated light beam from the light collecting mirror 112 enters the lens arrangement 116 via the converging axicon lens portion and exits the lens arrangement 116 via the diverging axicon lens portion. The converging axicon lens portion may be also referred to as a convex axicon lens portion, as a positive axicon lens portion or as diverging/convex/positive axicon lens surface, whereas the diverging axicon lens portion may be also referred to as a concave axicon lens portion, as a negative axicon lens portion or as a converging/concave/negative axicon lens surface. The lens arrangement 116 may be positioned with respect to the light collecting mirror 112 such that an optical axis of the lens arrangement 116 is parallel to the axis of the light collecting mirror 112 and such that the optical axis of the lens arrangement 116 (conceptually) intersects a surface of the light collecting mirror 112 at a position of the aperture therein. In case the aperture is substantially centrally located in the light collecting mirror 112, the optical axis of the lens arrangement 116 is substantially parallel to a center axis of the collimated light beam reflected from the light collecting mirror 112.

The light beam reflected from the light collecting mirror 112, due to the aperture therein, has a substantially annular cross-section, inner diameter of which depends on the size of the aperture. In other words, the light beam entering the lens arrangement 116 has a central 'dark spot'. Such light beam would highly likely result in compromised detection performance especially with low numerical aperture spectrometers. However, the lens arrangement 116 serves to convert the collimated annular light beam entering thereto into a collimated light beam of a reduced diameter: the converging axicon lens portion serves to convert the collimated annular light beam reflected from the light collecting mirror 112 into a convergent annular light beam, whereas the diverging axicon lens portion serves to convert the convergent annular light beam back into a collimated light beam having a diameter that is smaller than that of the light beam entering the lens arrangement 116. In this regard, the distance between the converging axicon lens portion and the diverging axicon lens portion is selected such that convergence of the light beam within the lens arrangement 116 reduces the inner diameter of the annular cross-section of the light beam upon entry to the lens arrangement 116 by a desired amount or completely converts the light beam into one having a substantially circular cross-section. In this regard, the distance between the converging axicon lens portion and the diverging axicon lens portion may be selected in dependence of the size of the aperture in the light collecting mirror 112. In other words, the lens arrangement 116 serves to reduce the size of the central 'dark spot' or completely eliminate the central 'dark spot' in the light beam that conveys the optical emission invoked in the sample 130, thereby facilitating improved detection performance by the detector assembly 106.

The lens arrangement 116 may be provided using one or more lenses. In an example, the lens arrangement 116 may comprise a single lens having the converging axicon portion and the diverging axicon portion at a suitable distance from each other to reduce the diameter of the (annular) light beam entering the lens arrangement 116 by a desired extent. Such a lens is schematically illustrated in the example of FIG. 2 and it may be referred to as a double-axicon lens or as a meniscus-axicon lens. In another example, the lens arrangement 116 may comprise two separate lenses including a converging axicon lens and a diverging axicon lens arranged in the same optical axis with a suitable distance from each other to reduce the diameter of the (annular) light beam entering the lens arrangement 116 by a desired extent.

The focusing mirror 114 may comprise an off-axis parabolic mirror having its focal point at the detector interface 106a. The focusing mirror 114 may be arranged with respect to lens arrangement 116 such that it is able to receive the light beam transferred through the lens arrangement 116, e.g. such that the optical axis of the lens arrangement 116 intersects a surface of the focusing mirror 114. In this regard, the focusing mirror 114 may be positioned with respect to the lens arrangement 116 such that the optical axis of the lens arrangement 116 is aligned (e.g. coaxial) with the optical axis of the focusing mirror 114 and thereby intersects the surface of the focusing lens 114 substantially at a center thereof. Consequently, the optical axis of focusing mirror 114 is aligned with the axis of the light collecting mirror 112 as well. Hence, the off-axis parabolic focusing mirror 114 serves to focus the collimated light beam received from the light collecting mirror 112 from the lens arrangement 116 to the detector interface 106a.

Typically, the space containing optical engine 101 is positioned within the housing of the analyzer instrument 100 in a location that can be conveniently brought into immediate vicinity of the sample 130 or, conversely, the space containing the optical engine 101 may be positioned in the housing such that the sample 130 can be conveniently brought into immediate vicinity thereof in order to bring the surface of the sample 130 at the target position 130a. As an example, in case of a handheld analyzer instrument 100 the space containing the optical engine 101 may be located in a front end of the analyzer instrument 100, which may be held against the sample 130 when analyzing the sample 130, where the front end may be designed such that the surface of the sample 130 sets to the target position 130a upon holding the front end of the analyzer instrument 100 against the sample 130.

In this regard, the opening in the space containing the optical engine 101 that allows for the excitation to exit the space and the optical emission to enter the space may be closed by a sample window 120, which is able to transmit the excitation originating from the exciter 102 and the optical emission invoked from the sample 130 while it may close the space containing the optical engine 101 in order to prevent moisture, dirt, dust etc. from exterior of the housing from entering the space.

Figure 3:
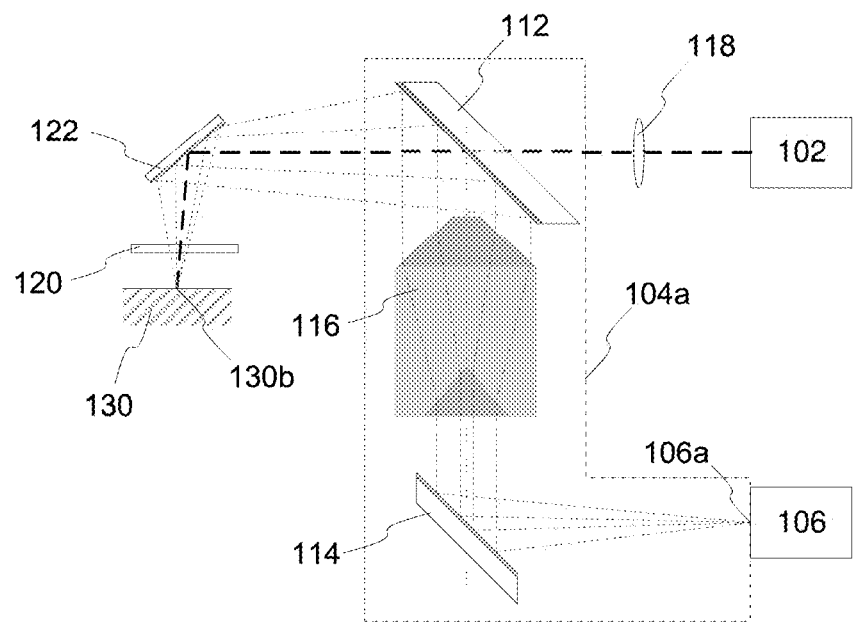
FIG. 3 schematically illustrates some aspects of an optical engine according to an example together with some elements of an analyzer instrument and with a sample.

FIG. 3 schematically illustrates some aspects of the optical engine 101 according to another example together with some elements of the analyzer instrument 100 and with the sample 130. In this regard, the example of FIG. 3 is similar to that of FIG. 2 with the exception that the optical arrangement 104 further comprises a scanning mirror 122 arranged in the propagation path of the excitation such that the light collecting mirror 112 resides between the scanning mirror 122 and the exciter 102. The scanning mirror 122 may be arranged in an oblique angle with respect to the propagation path of the excitation, thereby folding the excitation towards a reflected target position 130b. The scanning mirror 122 further serves to reflect the optical emission invoked from the sample 130 towards the light collecting mirror 112.

The scanning mirror 122 may be moveable with respect to the exciter 102 and with respect to the light collecting mirror 102 (as well as with respect to other components of the optical engine 101) such the orientation of the scanning mirror 122 with respect to the exciter 102 and with respect to the light collecting mirror 112 and/or a distance between the scanning mirror 122 and the exciter 102 (as well as a distance between the scanning mirror 122 and the light collecting mirror 112) is changed in order to move the reflected target position 130b with respect to the analyzer instrument 100 and with respect to the sample 130. The movement of the scanning mirror 122 may be effected via operation of an actuator (not shown in the illustration of FIG. 3) that may operate under control of the controller 108. The scanning mirror 122 and the actuator may be considered as elements of a scanning assembly. The scanning assembly may be applied, for example, to provide a scanning according to a predefined scanning pattern in order to invoke the optical emission on a larger area on the sample 130 and/or in order to invoke the optical emission from a certain position of the sample 130.

In another example, movement of the target position 130a with respect to the analyzer instrument 100 and with respect to the sample 130 may be provided via movement of the optical engine 101. In this regard, the movement of the optical engine 101 keeps the spatial relationship between the exciter 102, the light collecting mirror 112, the lens arrangement 116, the focusing lens 114 and the detector interface 106a unchanged while the movement results in moving the target position 130a with respect to the analyzer instrument 100 and with respect to the sample 130. Also in this example the movement may be effected via operation of an actuator that may operate under control of the controller 108, whereas in this example the optical engine 101 in its entirety and the actuator may be considered as elements of the scanning assembly.

The extent of movement of the target position 130a, 130b with respect to the analyzer instrument 100 and the sample 130 enabled by the scanning assembly is typically in a range of a few millimeters. While in case of providing the scanning assembly that relies on the scanning mirror 122 (e.g. according to the example of FIG. 3), the movement of the reflected target position 130b may result in slightly offsetting the reflected target position 130b from the surface of the sample 130. However, due to relatively small movement of the reflected target position 130b enabled by the scanning assembly, this has substantially negligible effect on the optical emission invoked from the sample 130 and hence such an offset does not degrade the detection performance provided by the detector assembly 106.

In an example, some aspects pertaining to the optical engine 101 described in the present disclosure may be operated in accordance with a method 200 for facilitating analysis of elemental composition of the sample 130 using optical emission spectroscopy, illustrated by the flowchart depicted in FIG. 4. The method 200 comprises generating the excitation focused at the target position 130a, 130b to invoke the optical emission from the sample 130 positioned at the target position 130a, 130b, as indicated in block 202, and transferring the optical emission from the target position 130a, 130b to the detector interface 106a of the detector assembly 106, as indicated in block 204. The transfer of the optical emission from the target position 130a, 130b to the detector interface 106a may comprise the following steps:

reflecting the optical emission originating from the target position 130a, 130b as a collimated light beam having a substantially annular cross-section via using the off-axis parabolic light collecting mirror 112 including an aperture and having its focal point at the target position 130a, 130b and that is disposed with respect to the exciter 102 such that the propagation path of the excitation passes through the aperture, as indicated in block 204a;

converting the collimated light beam received from the light collecting mirror 112 into a converted collimated light beam of reduced diameter having a substantially circular cross-section via using the lens arrangement 116 comprising the converging axicon lens portion followed by the diverging axicon lens portion, which lens arrangement 116 is disposed with respect to the light collecting mirror 112 such that its optical axis is parallel to the optical axis of the light collecting mirror 112 and intersects the surface of the light collecting mirror 112 at a position of the aperture therein, as indicated in block 204b, and focusing the converted collimated light beam received from the lens arrangement 116 to the detector interface 106a via using the off-axis parabolic focusing mirror 114 having its focal point at the detector interface 106a and that is disposed with respect to the lens arrangement 116 such that the optical axis of the lens arrangement 116 is parallel to the optical axis of focusing mirror 114 and intersects the surface of the focusing mirror 114, as indicated in block 204c.

The method 200 may be varied and/or complemented in a number of ways, for example as described in the foregoing via a number of examples pertaining to the optical engine 101 and/or to the analyzer instrument 100 making use of the optical engine 101 to enable analysis of elemental composition of the sample 130 using optical emission spectroscopy.

According to an example, the analyzer instrument 100 may be arranged for an automated tracking of a target of interest. In this regard, the analyzer instrument 100 may comprise a camera arranged to capture images of an area around the target position 130a, 130b, whereas the controller 108 may be arranged to carry out an image analysis based on one or more images obtained from the camera and to operate the scanning assembly to move the target position 130a, 130b to a location that overlaps the target of interest. In case the analyzer instrument 100 is positioned for analysis of the sample 130 (e.g. a handheld analyzer instrument 100 held against the sample 130) or vice versa, the images captured by the camera may comprise images of the sample 130 that depict an area around the target position on the surface of the sample 130.

Figure 5:
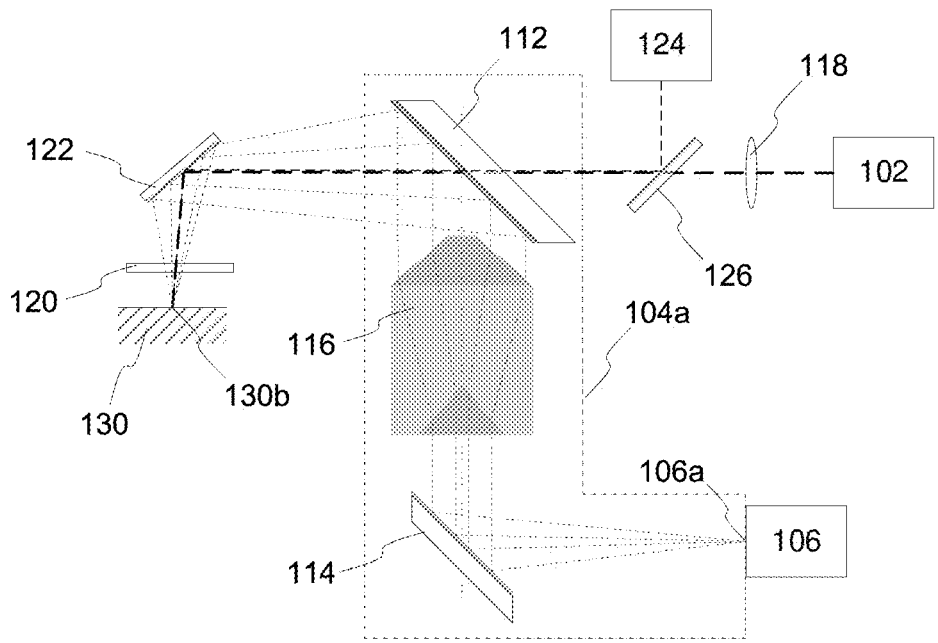
FIG. 5 schematically illustrates some aspects of an optical engine according to an example together with some elements of an analyzer instrument and with a sample.

The camera may be provided as an element that is at least partially integrated to the optical engine 101 or as an element that is independent of the optical engine 101 but that follows the movement of the target position 130a, 130b due to operation of the scanning assembly. As an example of the former approach, FIG. 5 schematically illustrates some aspects of the optical engine 101 according to a further example together with some elements of the analyzer instrument 100 and with the sample 130. The example of FIG. 5 is based on the example of FIG. 3 with addition of a camera 124 and a beam splitter 126. The beam splitter 126 is disposed in the propagation path of the excitation in an oblique angle thereto such that it folds the camera view through the aperture in the light collecting mirror 112 and via the folding mirror 122 while the beam splitter 126 transmits the excitation therethrough in the opposite direction. In this regard, the beam splitter 126 may comprise, for example, a dichroic mirror.

Along the lines described in the foregoing, the image analysis may comprise analyzing the one or more images obtained from the camera in order to identify the target of interest, thereby implementing an application of machine vision. In this regard, the image analysis may be carried out using a suitable technique known in the art. The controller 108 may obtain knowledge of the target of interest, for example, based on user input obtained via the UI of the analyzer instrument 100. As an example in this regard, images obtained from the camera may be shown on a display of the UI and the user may operate the UI to indicate the target of interest in images displayed therein.

Some aspects pertaining to the automated tracking of the target of interest described in the present disclosure may be operated in accordance with a method 300 that is illustrated by the flowchart depicted in FIG. 6. The method 300 comprises obtaining the one or more images of the sample 130 depicting the area around the target position 130a, 130b, as indicated in block 302, carrying out the image analysis based on the obtained one or more images to identify the target of interest in the one or more images, as indicated in block 304, and moving the target position 130a, 130b with respect to the sample 130 to a location that overlaps the target of interest, as indicated in block 306. Moreover, the method 300 may further comprise carrying out the analysis of elemental composition via application of the method 200 described in the foregoing. The method 300 may be varied and/or complemented in a number of ways, for example as described in the foregoing via a number of examples pertaining to the optical engine 101 and/or to the analyzer instrument 100 making use of the optical engine 101 to enable analysis of elemental composition of the sample 130 using optical emission spectroscopy.

The aspects pertaining to the automatic tracking are described herein with references to the analyzer instrument 100 that makes use of the optical engine 101 and the light collection arrangement 104a described in the present disclosure. However, the automatic tracking as described in the foregoing is likewise applicable in analyzer instruments making use of light collection assemblies of different type, provided that the analyzer instrument and/or the applied optical engine is equipped with the scanning assembly that allows for movement of the target position with respect to the analyzer instrument and with respect to the sample under study.

Referring back to the example of FIG. 1, the controller 108 may be provided by a respective hardware means, by a respective software means or by a respective combination of a hardware means and a software means. As an example in this regard, FIG. 7 schematically depicts some components of an apparatus 400 that may be employed to implement the controller 108. The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the UI of the analyzer instrument 100 for receiving input from a user and/or for providing output to the user. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 450 that enables transfer of data and control information between the components.

The memory 420 and a portion of the computer program code 425 stored therein may be further arranged, with the processor 410, to provide the controller 108. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement at least some functions of the controller 108 when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to operate as the controller 108 e.g. according to operations, procedures and/or functions described in the foregoing. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to operate as the controller 108 e.g. in accordance with operations, procedures and/or functions described in the foregoing.

The computer program code 425 may be provided e.g. a computer program product comprising at least one computer-readable non-transitory medium having the computer program code 425 stored thereon, which computer program code 425, when executed by the processor 410 causes the apparatus 400 to operate as the analyzer controller 108 e.g. according to operations, procedures and/or functions described in the foregoing. The computer-readable non-transitory medium may comprise a memory device or a record medium that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An optical assembly for an analyzer apparatus for analysis of elemental composition of a sample using optical emission spectroscopy, the optical assembly comprising:
   an exciter for generating an excitation focused at a target position to invoke an optical emission from the sample positioned at the target position; and
   an optical arrangement comprising a light collection arrangement for transferring the optical emission from the target position to a detector interface of a detector assembly, the light collection arrangement comprising:
      an off-axis parabolic light collecting mirror including an aperture and having the off-axis parabolic light collecting mirror's focal point at the target position, disposed with respect to the exciter such that a propagation path of the excitation passes through the aperture,
      a lens arrangement comprising a converging axicon lens portion followed by a diverging axicon lens portion, the lens arrangement disposed with respect to the light collecting mirror such that the lens arrangement's optical axis is parallel to an optical axis of the light collecting mirror and intersects a surface of the light collecting mirror at a position of the aperture therein, and
      an off-axis parabolic focusing mirror having a focal point at the detector interface, disposed with respect to the lens arrangement such that the optical axis of the lens arrangement is parallel to an optical axis of the focusing mirror and intersects a surface of the focusing mirror.

2. The optical assembly according to claim 1, wherein said aperture is substantially at a position of the optical axis of the light collecting mirror.

3. The optical assembly according to claim 1, wherein the optical axis of the light collecting mirror is substantially perpendicular to the propagation path of the excitation.

4. The optical assembly according to claim 1, wherein the optical axis of the light collecting mirror is in an oblique angle with respect to the propagation path of the excitation.

5. The optical assembly according to claim 1, wherein the optical arrangement further comprises a focusing lens for focusing the excitation at the target position, disposed in the propagation path of the excitation between the exciter and the light collecting mirror.

6. The optical assembly according to claim 1, wherein the lens arrangement is disposed with respect to the light collecting mirror such that the optical emission reflected from the light collecting mirror is arranged to enter the lens arrangement via the converging axicon lens portion and exit the lens arrangement via the diverging axicon lens portion.

7. The optical assembly according to claim 1, wherein the lens arrangement comprises a meniscus-axicon lens.

8. An analyzer instrument for analysis of elemental composition of a sample using optical emission spectroscopy, the analyzer instrument comprising an optical assembly according to claim 1 arranged in a space within a portion a housing of the analyzer instrument.

9. The analyzer instrument according to claim 8, wherein the optical assembly is arranged in said space such that
   the target position is set substantially at a surface of the sample when said portion of the housing is set against the sample, and
   said space is provided with an opening that enables the excitation to exit the space and enables the optical emission to enter the space.

10. The analyzer instrument according to claim 9, wherein the opening to said space is closed by a sample window that is able to transmit the excitation and the optical emission therethrough.

11. The analyzer instrument according to claim 8, further comprising a scanning assembly for moving the target position with respect to the analyzer instrument.

12. The analyzer instrument according to claim 11, wherein one of the following applies:
   the optical arrangement comprises a moveable scanning mirror arranged in the propagation path of the excitation for reflecting the excitation and the optical emission in dependence of a position and/or orientation of the scanning mirror and an actuator for moving the scanning mirror in order to move the target position accordingly;

the optical assembly is moveable with respect to the housing and wherein the analyzer instrument comprises an actuator for moving the optical assembly in order to move the target position accordingly.

13. The analyzer instrument according to claim 11, further comprising
a camera arranged to capture images of an area around the target position; and
a controller arranged to:
carry out an image analysis based on one or more images obtained from the camera to identify a target of interest in said images, and
operate the scanning assembly to move the target position to a location that overlaps the target of interest.

14. A method for facilitating analysis of elemental composition of a sample using optical emission spectroscopy, the method comprising:
generating an excitation focused at a target position to invoke an optical emission from the sample positioned at the target position; and
transferring the optical emission from the target position to a detector interface of a detector assembly, comprising:
reflecting the optical emission originating from the target position as a collimated light beam having a substantially annular cross-section via using an off-axis parabolic collecting mirror including an aperture, the off-axis parabolic collecting mirror having a focal point at the target position and disposed with respect to the exciter such that a propagation path of the excitation passes through the aperture,
converting the collimated light beam received from the light collecting mirror into a converted collimated light beam of a reduced diameter having a substantially circular cross-section via using a lens arrangement comprising a converging axicon lens portion followed by a diverging axicon lens portion and disposed with respect to the light collecting mirror such that the lens arrangement's optical axis is parallel to an optical axis of the light collecting mirror and intersects a surface of the light collecting mirror at a position of the aperture therein, and
focusing the converted collimated light beam received from the lens arrangement to the detector interface via using an off-axis parabolic focusing mirror having a focal point at the detector interface and that is disposed with respect to the lens arrangement such that the optical axis of the lens arrangement is parallel to an optical axis of focusing mirror and intersects a surface of the focusing mirror.

15. The method according to claim 14, further comprising:
obtaining one or more images of the sample depicting an area around the target position;
carrying out an image analysis based on the one or more images to identify a target of interest in the one or more images; and
move the target position with respect to the sample to a location that overlaps the target of interest.

16. The optical assembly according to claim 2, wherein the optical axis of the light collecting mirror is substantially perpendicular to the propagation path of the excitation.

17. The optical assembly according to claim 2, wherein the optical axis of the light collecting mirror is in an oblique angle with respect to the propagation path of the excitation.

18. The optical assembly according to claim 2, wherein the optical arrangement further comprises a focusing lens for focusing the excitation at the target position, disposed in the propagation path of the excitation between the exciter and the light collecting mirror.

19. The optical assembly according to claim 3, wherein the optical arrangement further comprises a focusing lens for focusing the excitation at the target position, disposed in the propagation path of the excitation between the exciter and the light collecting mirror.

20. The optical assembly according to claim 4, wherein the optical arrangement further comprises a focusing lens for focusing the excitation at the target position, disposed in the propagation path of the excitation between the exciter and the light collecting mirror.

* * * * *